(12) United States Patent
George

(10) Patent No.: US 7,477,905 B2
(45) Date of Patent: *Jan. 13, 2009

(54) PSEUDOPOSITION GENERATOR

(75) Inventor: James George, Calgary (CA)

(73) Assignee: Useful Networks Canada, ULC, Calgary, Alberta (CA)

( * ) Notice: Subject to any disclaimer, the term of this patent is extended or adjusted under 35 U.S.C. 154(b) by 567 days.

This patent is subject to a terminal disclaimer.

(21) Appl. No.: 10/792,385

(22) Filed: Mar. 4, 2004

(65) Prior Publication Data

US 2004/0229631 A1 Nov. 18, 2004

Related U.S. Application Data

(60) Provisional application No. 60/451,274, filed on Mar. 4, 2003.

(51) Int. Cl.
*H04Q 7/20* (2006.01)
*A63F 9/24* (2006.01)

(52) U.S. Cl. .................. 455/456.1; 455/456.2; 455/463; 455/457

(58) Field of Classification Search ............... 455/456.1, 455/456.2, 456.3, 456.5, 456.6, 457, 463, 455/91; 342/463, 464; 463/41
See application file for complete search history.

(56) References Cited

U.S. PATENT DOCUMENTS

| | | | |
|---|---|---|---|
| 6,287,200 B1 | | 9/2001 | Sharma |
| 6,529,165 B1 | * | 3/2003 | Duffett-Smith et al. ..... 342/463 |
| 6,553,236 B1 | * | 4/2003 | Dunko et al. ............. 455/456.1 |
| 2002/0111201 A1 | * | 8/2002 | Lang ............................ 463/2 |
| 2003/0224855 A1 | * | 12/2003 | Cunningham ................ 463/41 |
| 2004/0002843 A1 | | 1/2004 | Robarts et al. |
| 2004/0192349 A1 | * | 9/2004 | Reilly ..................... 455/456.2 |

FOREIGN PATENT DOCUMENTS

EP 840094 A2 * 5/1998

OTHER PUBLICATIONS

Bruce; THe Mobile Manhunt; Jan. 31, 2002; http://technology.guardian.co.uk.*
Sears, Francis W., Zemansky, Mark W., Young, Hugh D. "Motion in a Straight Line"; University Physics—Sixth Edition; Addison-Wesley Publishing Company; Reading, Massachusetts, 1982, p. 1-165.
Maitland, C., Van De Kar, E., Wehn de Montalvo, U.; "Business Models for Innovative Telamatics Applications (BITA)—Overview of Mobile Information and Entertainment Services"; Research Report; Telematica Instituut; Netherlands, Oct. 2002, p. 23.
Thomas, G.B., Finney, R.L.; "Calculus and Analytical Geometry—Fifth Edition"; Addison-Wesley Publishing Company, Reading, Massachusetts; 1979; p. 388-404.

(Continued)

*Primary Examiner*—Melur Ramakrishnaiah
(74) *Attorney, Agent, or Firm*—Woodcock Washburn LLP

(57) ABSTRACT

A method of tracking an object using a mobile transceiver carried by the object, the method comprising the steps of receiving, at a computer, location information from the mobile transceiver; computing a predicted location of the mobile transceiver from the location information; and forwarding the predicted location to a user.

19 Claims, 4 Drawing Sheets

OTHER PUBLICATIONS

Klukas, R.W.; "A Superresolution Based Cellular Positioning System Using GPS Time Synchronization"; UCSE Report No. 20114; Department of Geomatics Engineering; The University of Calgary, Dec. 1997; p. 1-224.

"Accuracy is Addictive"; Case History—The Economist Technology Quaterly; The Economist; Mar. 16, 2002; p. 24-25.

An excerpt of a dialogue on Feb. 11, 2002, on an on-line forum called "Interesting People"; found at www.interesting-people.org/archives/interesting-people.html.

Sweberg, G.; Ericsson's Mobile Location Solution, Ericsson Review 4, 1999; 8 pages.

Nicklas, D., Pfistered Ch., Mitschang, B.; "Towards Location-Based Games"; copy of a whitepaper presented at the 1st Annual Conference on Applications and Development of Computer Games in the 21st Century held Nov. 22-23, 2001, City University of Hong Kong; 7 pages.

\* cited by examiner

PSEUDOPOSITION GENERATOR

This application claims the benefit under 35 USC 119 of provisional application U.S. 60/451,274 filed Mar. 4, 2003.

BACKGROUND

This invention relates to the field of mobile positioning of mobile devices which may include mobile telephones and wireless transmitters for provision of wireless location-based services which may include mobile location-based game services.

Background art in the field of mobile phone positioning is shown by Klukas, R. W., "A Superresolution Based Cellular Positioning System Using GPS Time Synchronization," UCSE Report Number 20114, Department of Geomatics Engineering, The University of Calgary, December 1997 and by Swedberg, G., "Ericsson's mobile location solution," Ericsson Review 4, (1999).

Many mobile positioning systems have over the past several years been developed and deployed on a local, regional as well as a global basis. The most notable of these systems is the US Department of Defense's Global Positioning System (GPS) that has been in existence for the past 30 odd years but only commercialized since the late 80's. Although this system was initially designed and built for navigation it has steadily become a very accurate and reliable mobile positioning system for all types of commercial and consumer applications. A case in point, is provided in an article entitled, "Accuracy is addictive", in the March, 2002 publication of The Economist Technology Quarterly issue, where the author describes GPS accuracy in the following manner: "Today, the public can get GPS position fixes with an accuracy of three to 15 meters, depending on where they are." Other comments in this article provide further insight into the usefulness of the accuracy of GPS and where it is going: "Already the basis of a $12 billion global industry, GPS is in example of a self-perpetuating innovation: the better it gets, the more uses people find for it."

The Russians have an equivalent global navigation satellite system called Glonass however it usefulness has become marginalized due to the cost of maintenance of the system; nontheless, it is capable of providing the same types of position accuracies as GPS. Not to be out done, the Europeans also have started to develop their own version of GPS called Galileo; this system is expected to be operational sometime in the later half of this decade.

Other types of mobile positioning systems have been (and are still being) developed and commercialized in support of the US E911 mandate which is expected to become law by 2005. These other types of mobile positioning systems are typically referred to a terrestrial based mobile positioning systems that are either network-based, network-based/handset-assisted, handset-based or handset-based/network-assisted. These systems employ one of or a combination of the following mobile positioning methods: Signal level, Angle of Arrival (AOA), Time of Arrival (TOA), Time Difference (TDOA/E-OTD/U-TDOA), GPS or Assisted GPS.

Regardless of the type of mobile positioning system and underlying technology characteristics they are all designed with a common goal in mind: to be the most accurate, reliable and low-cost mobile positioning system, full stop. It is clear that these systems will provide varying levels of accuracy and reliability along the way to reaching this common objective. GPS is clearly the front-runner in this regard and as such has gained tremendous momentum as being the globally accepted solution for mobile positioning applications currently and in the future. This is not to say that the other variants won't play a part in the mobile positioning industry but it is quite clear that these other systems will be considered as niche plays.

Having said this, the trend is clear that current and future mobile positioning systems will have to deliver a sufficient level of accuracy and reliability in order to be recognized as at least providing the same level of performance as GPS in order to compete. Therefore it is also clear that any successful mobile positioning system will need to deliver very accurate and reliable positioning performance. And as is being proven with GPS the more accurate and reliable a mobile positioning system is the more uses people find for it.

Case in point, these uses are starting to emerge in many areas and may include information and entertainment based services such as those described in a research report produced by Telematica Instituut, entitled, "Overview of Mobile Information and Entertainment Services". In this report three mobile location-based services are highlighted in the case studies which include a mobile location-based game service called, Botfighters; a mobile location-based directory service, called Info Here&Now and a locate a friend service, called FindFriends.

It is interesting to note that each of these services is being offered in its current state with a mobile positioning technique called Cell of Origin/Cell-ID (CID) which provides location information based on which cell site and sector the mobile device registered to. This position information is only accurate to within a few hundred meters but is sufficient as a starting point for service providers to offer the said services. It is still too early to determine how much of a limiting effect this level of positioning capability will have on the success of the service being offered. Having said this and reflecting on the trends for mobile positioning systems it is very reasonable to expect that these services will adopt a mobile positioning system which provides increased accuracy and reliability to the users of the service.

These current methods of mobile positioning provide "bookends" to the mobile location-based service spectrum. On the one end you have a course level of accuracy, the cell-site and sector methodology, and on the other end of the spectrum you have a very precise level of accuracy, the GPS system. It can be stated that all mobile positioning systems fall somewhere within these bookends with the majority tending towards the GPS level of accuracy and reliability. Thus the case is made that all mobile positioning systems, except for the cell-site and sector system will eventually be capable of delivering (or nearly so) the GPS level of performance.

The accurate and reliable performance targets are understandable considering the success of GPS, but they bring with them perhaps some unwanted affects that are not perhaps being considered at this moment. Consider the case of the wireless location-based game service called, Botfighters. This service [which currently uses the cell-site and sector approach for its positioning approach and is yielding accuracies to within several hundred meters] has received high acclaim from industry analysts, and users alike. However there are others who have provided insight into the future offering when more accurate position information is offered as part of the game play. These insights are reflected in the following comments on a on-line forum called, INTERESTING-PEOPLE (www.interesting-people.org) where one game reviewer stated, "Here's an alternative vision: you are in a crowded high street, pursuing your quarry using your phone. The handset beeps again and then, just as you close in, a hand clasps your shoulder, spins you around, you get punched in the face, then your assailant grabs your phone and legs it."

While the person making the comments may perhaps have a pessimistic view of what most other reviewers are calling an exciting and innovative game, he does highlight a very important point that anyone wanting to offer this type of service must consider: the safety and well-being of the game players given the potential for unwanted approaches or worse, physical attacks, from one player onto another knowing that their respective locations are known to sufficient accuracy and reliability that such an event could perhaps transpire quite easily.

It should be noted that in this same on-line forum a response is given by the CEO of the company which produced and currently offers the Botfighter service. In his remarks, the CEO of the company commented about the concerns expressed by reviewer and said, "When accuracy is improved by using GPS receivers in the handsets, the game design will be adopted by introducing sufficient level of inaccuracy in order to protect personal integrity". He goes on to say, "As a serious game provider we would of course never let the scenario of Mr. Hawkins actually happen in reality".

This exchange provides valuable insight into how wireless location-based games will have to evolve to guard against such pessimistic but unfortunately all too probable view as described in the on-line forum. This exchange also provides validity to the notion addressed herein that GPS will most likely be the logical choice in upgrading to a higher accuracy mobile positioning system and that the processes that this invention seeks to achieve will have to be deployed to address safety concerns of those involved in services such as wireless location-based games. Furthermore, this exchange provides insight into the fact that current game designs do not incorporate the processes that this invention seeks to achieve.

A crucial question is how does one deal with the disparate demands for differing levels of accuracy for differing service offerings? On the one hand you have those that demand high accuracy and reliability (for E911 services) and on the other hand you have those that do not want to be located to such precision as in the case of the wireless location-based game scenario.

It would be uneconomical (and thus unreasonable) for service providers to operate two mobile positioning systems (i.e. the cell-site and sector approach for services like wireless location-based games and the more accurate network-based or GPS approach for E911 services for example) for any extended length of time and therefore it is to be expected that service providers will adopt the more accurate and reliable mobile positioning systems sooner rather than later.

Case in point, the Unites States situation necessitates an adoption of the higher accuracy mobile positioning systems because of the E911 mandate dictates to have accurate mobile positioning systems in place by 2005. The rest of the world can afford to adopt the lower accuracy approach (i.e. The cell-site and sector method) as there is no such E911 mandate in place for the moment at least. The case as presented demonstrates that the focus for the US at least will be on higher accuracy mobile positioning systems to be put in place in the next several months and hence the rational for focused development on higher accuracy systems. It is further expected that this trend will take hold in other countries as well and thus the lower accuracy approach will be phased out sooner rather than later.

It is quite reasonable to expect that all those involved in developing, building and enhancing their respective mobile positioning systems (except for cell-site and sector approach—this approach is already built into the service providers existing infrastructure) are doing so in a very focused manner by constantly redesigning, developing, building and testing in an continual effort to achieve the highest level of mobile positioning performance attainable all within reasonable cost structures and time limits. In parallel to these efforts the service providers are looking for new and innovative services to leverage their commitment to roll-out higher accuracy mobile positioning systems. New innovative services like mobile location-based games are one such service that service providers in the US are looking to introduce in the US marketplace. The US is also dominated by "anti-big brother" perception where being tracked and located with any degree of certainty is not well received.

These market conditions provide a favorable climate for offering the public this invention that seeks to address fundamental issues regarding the safeguarding of one's well-being during times of leisure and game play and at the same time providing mechanisms to access accurate location information during times when it is needed.

SUMMARY

A method is provided for processing of position estimate information (i.e. Actual Position coordinates and time of Actual Position estimate) of a mobile device that has been positioned (located) by a mobile positioning system (terrestrial or satellite based) and subsequently computing a Pseudo-Position for the Actual Position of the mobile device for purposes of displaying the Pseudo-Position and not the Actual Position (location) of the mobile device.

A method is provided to compute a Pseudo-Position for the mobile device in such a manner as to preserve the integrity (accuracy and reliability), of the Actual (original) Position estimate as determined by the mobile positioning system and in no way alter the physics or mechanics of how the Actual Position estimate was determined in the first place.

A method is provided to safeguard the Actual Position (location) of the mobile device and by extension, the user of the mobile device, in the case where the user is in possession of the mobile device. The output is the near real-time reporting for display purposes a Pseudo-Position for the user's whereabouts that may be characterized, as being sufficiently spatially displaced relative to the Actual Position estimate to ensure that the user does not encounter unsolicited approaches or physical attacks from others who may have access to the user's location information such as would be the case in wireless location-based game play situations.

A method is provided for using actual position estimate information (position coordinates and time) to produce Pseudo-Position data for the mobile device for purposes of displaying ancillary information as to the exact whereabouts of the holder of the mobile device while involved in a game play situation for which the user is a willing participant while playing the mobile location-based game.

There is therefore provided a method of tracking an object using a mobile transceiver carried by the object. The method comprises the steps of receiving, at a computer, location information from the mobile transceiver or a computer network server; computing a pseudo-position of the mobile transceiver from the location information; and forwarding the pseudo-position to a user.

The user may perhaps want to toggle between using the Actual Position estimates and the Psuedo-Position estimates to enhance the excitement and thrill of the game play by adding an element of surprise and uncertainty to the level of game play.

The Psuedo-Position and the Actual Position estimate may be delivered simultaneously to the respective game player's mobile device for purposes of displaying more than one location for a particular player. This will have the effect of creating an element of uncertainty for the opponents as to which position is the actual target during the game play.

Processing the Actual (original) Position estimate information (coordinate pairs and time) may use coordinate geometry principles, laws of motion and spatial awareness principles (virtual boundary conditions) together with game and or sports principles including, but not limited to, elements of single player or multiplayer (team) aspects, physics, motion, boundaries, location, time and environmental parameters for purposes applying these elements in new and innovative combinations to produce new forms of wireless location-based game products and services.

While this provides a brief summary, further detail is found in the claims and disclosure that follow.

BRIEF DESCRIPTION OF FIGURES

There will now be described preferred embodiments, with reference to the drawings, by way of illustration only and not with the intention of limiting the scope of what is defined by the claims, in which like numerals denote like elements and in which:

DETAILED DESCRIPTION

Figure 1:
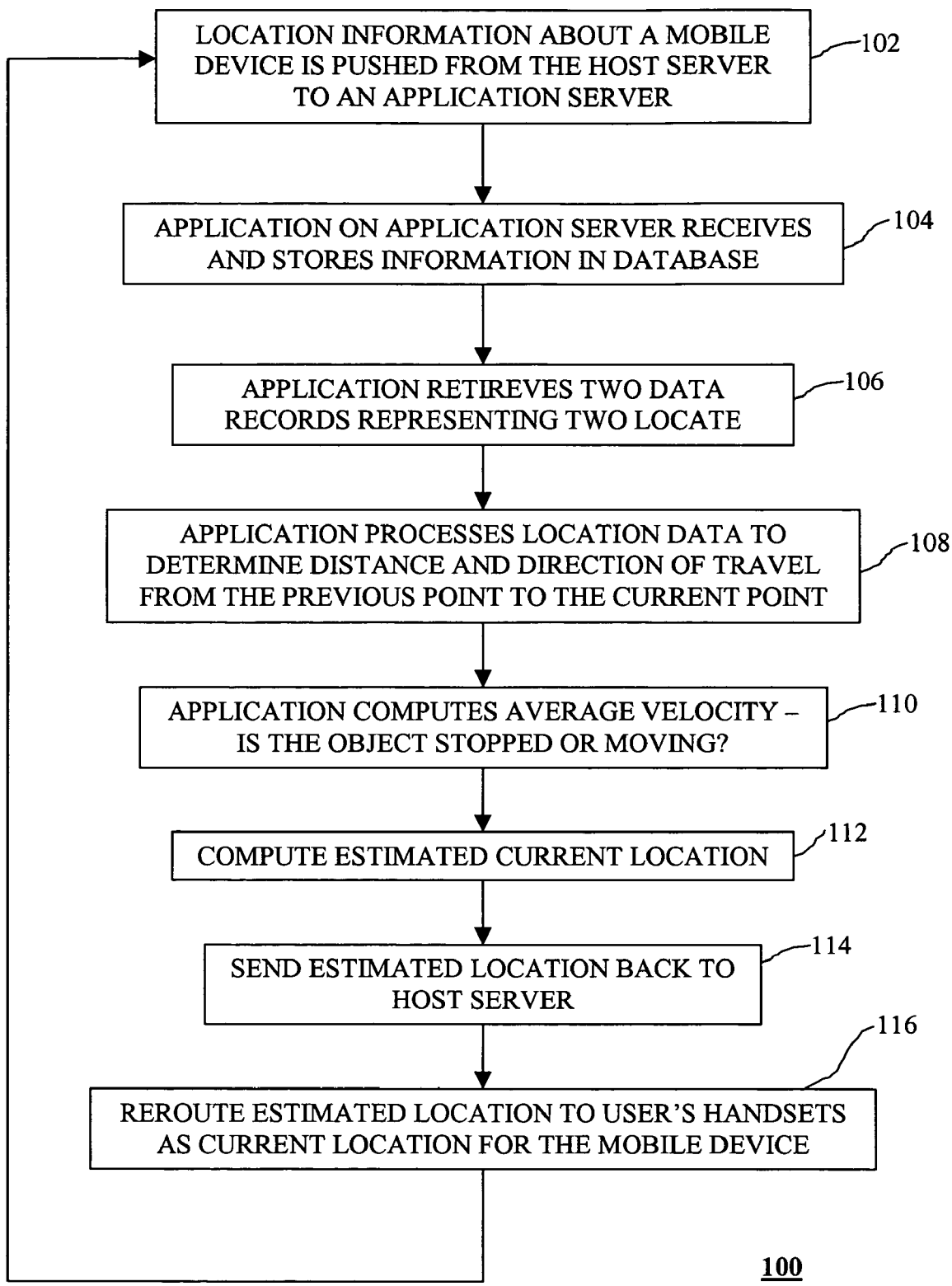
FIG. 1 is a flow diagram illustrating process steps of an embodiment of a method of providing pseudo-position information.

Referring now to FIG. 1 there is shown a flow diagram 100 illustrating process steps of a method of providing pseudo-position information. In step 102, a stream of data packets containing location information about a particular mobile device (mobile device identification such as a Mobile Identification Number—MIN, a coordinate pair or triplet describing the mobile device's location in space and the time of the locate) is pushed from the service provider's mobile positioning system host server to an application sewer. In step 104, the application residing on the application server receives this stream of data packets and stories the information contained in these packets in its own database. The application then retrieves from its database two data records that represent two locate events that occur in series one after another with the time interval being equal to the time interval of the mobile positioning system in step 106. In step 108, the application then processes the location data to determine the distance and direction of travel from the previous point to the current point (i.e. the point for which a Pseudo-Position is being computed). In step 110, this information is used to compute the average velocity of the mobile device while on its route. An analysis of the average velocity is performed to describe the motion of the mobile device during its travel between these two points—is the object stopped or moving? Using the description of motion for the mobile device as determined by equations for motion on a straight line and for linear momentum (based on Newton's laws of motion) combined with the direction of travel at the previous point and applying the principles of analytical (coordinate) geometry, a new location (or Pseudo-Position estimate) for the mobile device is computed in step 112, sent back to the service provider host server in step 114, and then rerouted for display on users handsets as the current location for the mobile device rather than the actual location as determined by the mobile positioning system in step 116. This process is repeated by returning again to step 102 for as long as the user requires that his actual whereabouts be safeguarded from others. This process will also preserve the Actual Position of the mobile device by leaving it intact and untouched at the service provider's mobile positioning system host server in the event that the user requires it rather than the Pseudo-Position estimate.

Figure 2:
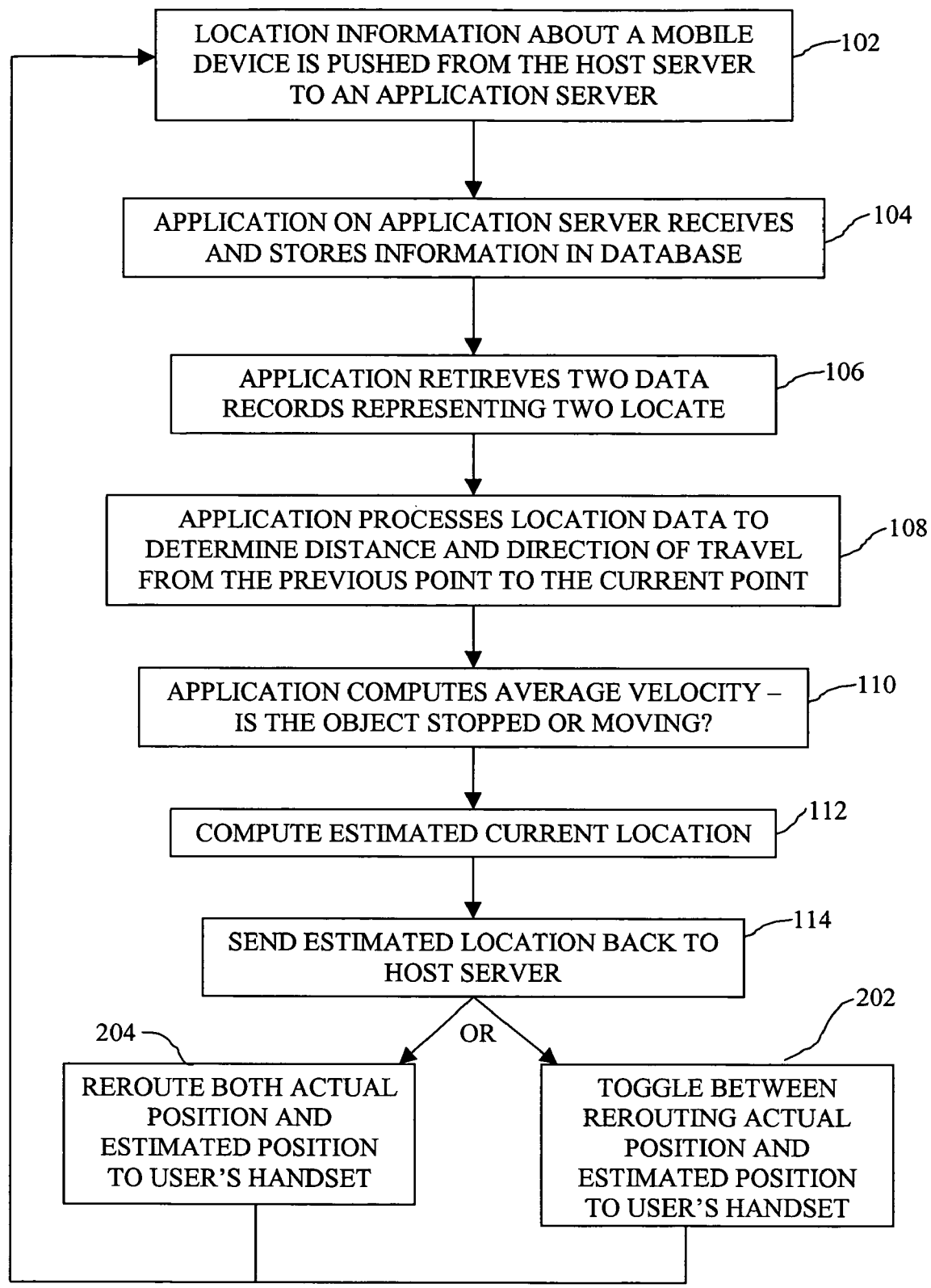
FIG. 2 is a flow diagram illustrating alternative process steps of an embodiment of a method of providing pseudo-position information.

Referring now to FIG. 2, alternatives to step 116 in FIG. 1 are shown. For example, in step 202, the user toggles between using the Actual Position estimates and the PsuedoPosition estimates to enhance the excitement and thrill of the game play by adding an element of surprise and uncertainty to the level of game play. In step 204, the PsuedoPosition and the Actual Position estimate are delivered simultaneously to the respective game player's mobile device for purposes of displaying more than one location for a particular player. This will have the effect of creating an element of uncertainty for the opponents as to which position is the actual target during the game play.

Figure 3:
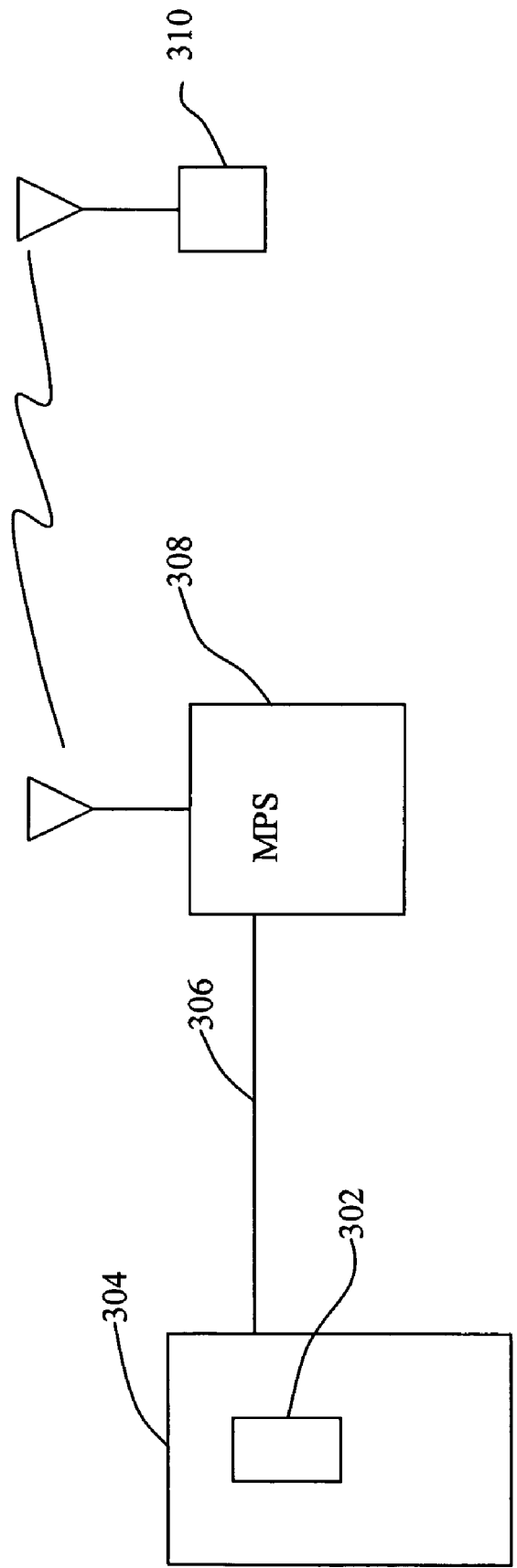
FIG. 3 is a block diagram of an apparatus for carrying out an embodiment of a method of providing pseudo-position information.

Referring now to FIG. 3, a preferred embodiment of a method of providing pseudo-position information is an application software module 302 residing on an application server 304 connected to a service provider's mobile positioning system host server 316 via high-speed data communications links 308 and is capable of receiving and delivering data packets to the service provider's mobile positioning system host server.

This application module receives data packets containing location information about a moving object (a mobile device) 310 as determined by the service provider's mobile positioning system while the mobile device is being moved about. In the preferred embodiment the data packets upon being delivered to and received by the application server are stored in a database also residing on the application server. In the preferred embodiment the mobile device is a cellular or PCS (Personal Communications Systems) telephone, a wireless transmitter such as a one or two-way data modem or a location beacon.

In the preferred embodiment the data packets contain location information about a mobile device (position coordinates and time of location and a mobile device identifier) at time intervals that coincide with the positioning frequency of the service provider's mobile positioning system (i.e. once per second, every 30 seconds, every minute, every 5 minutes, once an hour, etc.)

In the preferred embodiment the Actual Position estimate for the mobile device is described by its coordinates as referenced at a coordinate reference system. In the case of a geographic reference system, the coordinates are described as Latitude (F) and Longitude (k)— in the two-dimensional case, and Latitude (F) and Longitude (k) and Height (H)—in the three-dimensional case—where Height is referenced to the ellipsoidal height of the geographical reference system. In the case of a mapping plane coordinate system the points are described by its coordinates known as Eastings (X) and Northings (Y)—in the two-dimensional case, and X, Y and height—in the three-dimensional case—where height is referenced to mean sea level vertical datum. The time of locate (or Actual Position estimate) is referenced to either local time or GMT (Greenwich Meridian Time).

In the event that the coordinate position information contained in the data packets is referenced to the geographic coordinate system (latitude and longitude) these coordinates will be transformed to a mapping plane coordinate system such as a State Plane Coordinate System or a Universal Transverse Mercator (UTM) mapping system to generate two-dimensional (X and Y) coordinates for the point of interest. Mathematical computations using geographic coordinates are complex because these coordinates are related to ellipsoidal surfaces whereas mapping plane coordinates are related to a two-dimensional plane surface which allows for easy mathematical processing as described hereafter.

Figure 4:
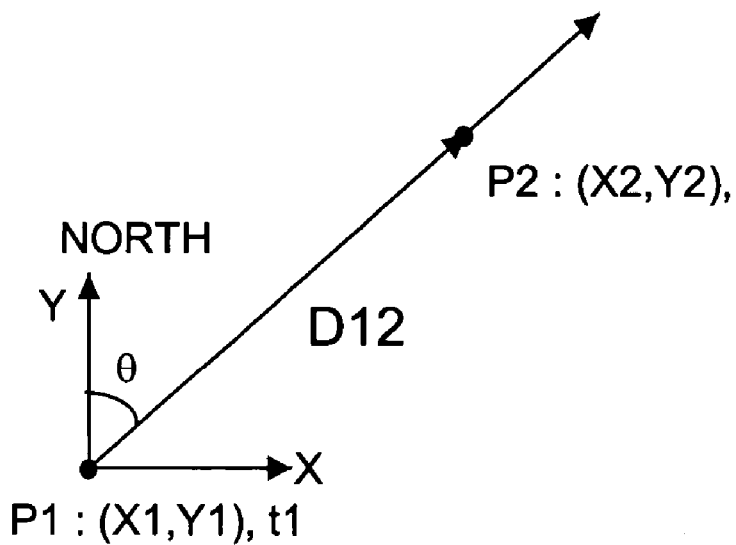
FIG. 4 is an illustration outlining the spatial relationship between the Actual Position estimates for two points whose position was determined from the Service Provider's mobile positioning system.

Also, temporary point identifiers are assigned to the Actual Position coordinates. In this embodiment the application is looking at just two successive position estimates and thus the temporary point identifiers for these positions will be labeled as Point 1 and Point 2. Point 1 will be assigned to the previous Actual Position coordinates and Point 2 will be assigned to the current Actual Position coordinates. Therefore in future computations these temporary point identifiers will be used to describe the spatial relationships, such as distance and direction, between these two point. The time associated with each of these points will be referenced to the time of their locate; for Point 1 (or the previous Actual Position) the time will be designated as $t_{p1}$ and for Point 2 (or the current Actual Position) it will be designated as $t_{p2}$. The expression for these assignments are as follows and are illustrated in FIG. 4:

Previous Actual Position=Point 1 (P1) contains coordinate pair: $(X_{P1}, Y_{P1})$ Current Actual Position=Point 2 (P2) contains coordinate pair: $(X_{P2}, Y_{P2})$ Time of locate for Previous Actual Position=$t_{p1}$ Time of locate for Current Actual Position=$t_{p2}$ Distance and Direction Calculations:

Using the coordinate pairs of Points P1 and P2 (triplets in the case of a three dimensional positioning) and applying the basic distance equation (Pythagorean' Theorem as shown by Thomas, G. B., Finney R. L., "Calculus and Analytical Geometry—Fifth Edition," Addison-Wesley Publishing Company, Reading, Mass., 1979, pp. 399.), a distance is computed between the two points and designated as $D_{12}$ as shown below:

$$D_{12} = Sqrt((X_{P2}-X_{P1})^2 + (Y_{P2}-Y_{P1})^2)$$

Using trigonometric relationships a direction of travel from the preceding point (Point 1) to the current point (Point 2) is determined. This direction of travel is referred to as an Azimuth direction (360° being defined as North).

The Azimuth line $P_{12}$ is determined as follows:

$$\Theta = arc\ tan\ ((X_{P2}-X_{P1})/(Y_{P2}-Y_{P1})),\ where\ \theta\ is\ expressed\ in\ radians$$

Average and Instantaneous Velocity Calculations:

Average and instantaneous velocity of a mobile device moving along a straight line is shown by Sears, Francis W., Zemansky, Mark W., Young, Hugh D., "*University Physics—Sixth Edition*," Addison-Wesley Publishing Company, Reading, Mass., 1982, pp. 39-42.

Using the distance just computed, $D_{12}$, and dividing by the time difference between the two points an average velocity, AvgV, is computed; this is presented by the following equation:

$$AvgV = D_{12}/\Delta t$$

where AvgV is expressed as m/s, and $\Delta t = t_{p2} - t_{p1}$.

Instantaneous Velocity Calculations:

It is important to note that because the Actual Position estimates are discrete points in time during the movement of the mobile device, instantaneous velocity cannot be computed. However if the mobile positioning system was capable of observing the speed of the mobile device at the time a position determination was made and if this information was included with the location information data packet then this speed may be interpreted as an instantaneous velocity which would allow for increased analysis as to the type of motion that the mobile device was experiencing. For the preferred embodiment it is sufficient to use the average velocity to analysis the motion of the mobile device. Future embodiments will account for the instantaneous velocity provided that the mobile positioning system has the capability measure it.

Analysis of Movement of the Mobile Device:

The location of the mobile device at discrete time intervals provides valuable insight into the type of motion that the mobile device is experiencing over a certain time interval. Very basic statements and assumptions are made by analyzing the average velocity of the mobile device. The list includes, but is not limited to, the following:

1. If the AvgV=0 m/s, (with a threshold of ±1 m/s as the preferred embodiment) then no displacement of the mobile device occurred during the time interval and hence the mobile device has not moved and is stationary.

2. If the AvgV>0, (with a threshold of greater than 1 m/s as the preferred embodiment) then displacement or movement of the mobile device has occurred during the time interval and movement is positive in the direction of travel from Point 1 to Point 2.

3. If the AvgV<0, (with a threshold of greater than 1 m/s as the preferred embodiment) then displacement or movement of the mobile device has occurred during the time interval and movement is negative in the direction of travel from Point 2 to Point 1 (the mobile device is moving backwards along the line formed by Points 1 and 2).

4. If the AvgV is negative or positive and is of the same magnitude to a velocity that is representative of a person strolling, walking, or running (2 m/s is the preferred embodiment—approximately 6.5 km/h) then it is assumed that the mobile device is being carried by a person and being moved about while the person is moving about.

5. If the AvgV is negative or positive and has a magnitude greater than 2 m/s but less than 5 m/s (the preferred embodiment) then it is assumed that the mobile device is being moved about by a person on a bicycle or roller blades or some form of wheeled transportation that is propelled by the person.

6. If the AvgV is negative or positive and has a magnitude greater than 5 m/s (the preferred embodiment) then it is assumed that the mobile device is being moved about by an object which can propel itself at the specified average velocity over the time interval during which the position estimates where measured. For all practical purposes the assumption in this scenario is that the mobile device is placed inside a vehicle.

Mass and Movement of Mobile Device:

Mobile positioning system locate mobile devices and as such track the movement of the mobile device. It goes without saying that these devices do not move or propel themselves; they are carried around either by a person possessing a mobile device or they are placed inside objects which do propel themselves around such as automobiles, trains, planes, boats, machinery of all types—basically anything that has a propulsion systems. The motion that is being is also the motion of the object that accompanies the mobile device. The object accompanying the mobile device has a mass much larger than the mobile device and this larger mass is affected by the Newton's laws of motion.

In the preferred embodiment the laws of linear momentum and conservation of momentum are used to describe the momentum of the mobile device as it is being moved along its route and then generate a PseudoPosition. The equations used to describe linear momentum are shown by Sears, Francis W., Zemansky, Mark W., Young, Hugh D., "*University Physics—Sixth Edition,*" Addison-Wesley Publishing Company, Reading, Mass., 1982, pp. 143-148.

$$\text{Linear Momentum} = \rho = mv$$

Where m=mass in kg of the object assumed to be accompanying the mobile device, and v=the velocity of the object (average velocity (AvgV) in the preferred embodiment)

To utilize these laws of motion the mass of the object accompanying the mobile device must be known. In the preceding section various velocities were associated with varying methods of mobility—a person walking, running, biking or a person riding in a moving vehicle. The following table represents the preferred embodiments of masses associated with varying methods of mobility:

| Object & Type of Mobility | Mass of Object (typical weight) |
|---|---|
| Person - walking, running, biking | 75 kg |
| Automobile - passenger car | 1500 kg |

A linear force (momentum) is now computed for the mobile device as it is being moved along its path from Point 1 to Point 2.

Applying the principle of conservation of linear momentum as described by Sears, Francis W., Zemansky, Mark W., Young, Hugh D., "*University Physics—Sixth Edition,*" Addison-Wesley Publishing Company, Reading, Mass., 1982, pp. 147, it is conceivable that if no resultant external force acts on the moving object (i.e. object accompanying the mobile device) it could continue to move with the same force and in the same direction indefinitely. Practically speaking this situation would be never transpire. But it does highlight a means by which the movement of the mobile device can be analyzed and simulated to project (or predict) where along its current path of travel the device may be positioned given a specified time during its travel. This position at time, T, in seconds, will represent the Psuedo-Position estimate for the Actual Position that is to be safeguarded.

Rearranging the linear momentum equation to solve for distance knowing the linear momentum force, $\rho$, the mass of the object, m, and the time, T, over which the force will act, the equation is:

$$d = (\rho * T)/m; \text{ where } d \text{ is in meters}$$

T is proportional to the time interval between successive locates for the mobile device (in the preferred embodiment T is ⅓ the time interval between successive position estimates as determined from the mobile positioning system). A Pseudo-Position may also be generated with T varying with different masses associated with different modes of movement such as walking or driving in an automobile.

It is preferred to simplify the use of the linear momentum equations by equating actual resultant forces such as friction, braking forces and collision forces to zero. Also, it is preferred to simplify the analysis of motion of the mobile device to that of a straight line such that the vector components of the linear momentum only act along one axis. Also, it is preferred to simplify the analysis of motion of the mobile device by making very general assumptions as to the mass and the velocity of the object accompanying the mobile device.

Generating a PseudoPosition may also use a more rigorous treatment of the forces that act on a moving object and which affect the analysis of motion of that moving object. The PseudoPosition may also be generated using other linear functions.

Psuedo-Position Calculation Using Coordinate Geometry:

Using the principles of analytical geometry and laws of motion, the movement of the mobile device is quantified between Point 1 and Point 2: direction is known, average velocity is known, through linear momentum and a specified time, T, a distance traveled along the path is known. Of prime importance is the distance and the direction of travel.

Figure 5:
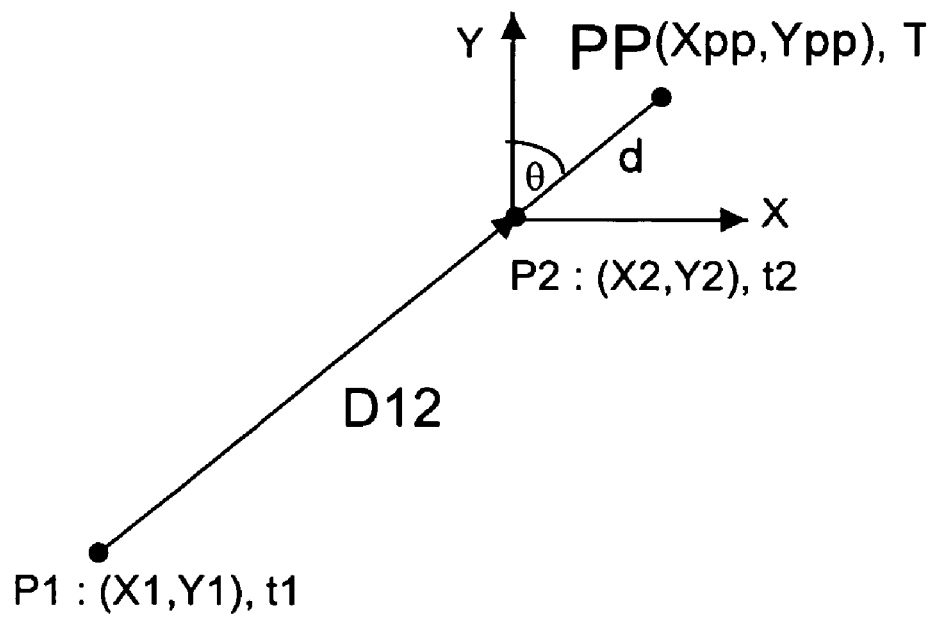
FIG. 5 is an illustration outlining the spatial relationship between the final output of a method of providing pseudo-position information: the Psuedo-Position estimate relative to Actual Position estimate (Point 2) that is being safeguarded.

In the preferred embodiment the Psuedo-Position coordinates are computed in relation to the current Actual Position estimate (or Point 2 in the computations). Coordinate Geometry functions are used to compute the coordinates of the Psuedo-Position by invoking a Forward Computation function such as LOCATE/AZIMUTH: this computes a point (designated as PP) given an azimuth (in this case the Azimuth $\theta$) and distance (in this case, d) from a known point (in this case the current Actual Position (Point 2)). The preferred embodiment is illustrated in FIG. 5.

In the preferred embodiment the application must always have as part of the process the actual coordinate information as delivered by the service provider's mobile positioning system. In this manner the process by which a Psuedo-Position is computed is always based on Actual Position data and thus the resulting Psuedo-Position estimate will be spatially displaced relative to the Actual Position of the mobile device and not to a previously computed Psuedo-Position estimate. This condition will allow for the user's location to be safeguarded and at the same time provide Psuedo-Position estimates that are spatially displaced to within limits that do not take away from the basic elements of the service being offered such as a mobile location-based game service.

In the event that the original coordinates were referenced to the geographic coordinate system then the coordinates for this Psuedo-Position estimate are transformed back to the geographic coordinates.

The Psuedo-Position estimate in its proper coordinate system is packetized and sent back to the service provider's mobile positioning system host server which in turn reroutes the Psuedo-Position estimate back to the users for display on their mobile device.

Immaterial modifications may be made to the embodiments described here without departing from what is defined by the claims.

What is claimed is:

1. A method processing location information relating to a mobile transceiver carried by an object, the mobile transceiver having an actual location comprising a first set of coordinates in a coordinate system, the method comprising the steps of:

receiving, at a computer, location information from the mobile transceiver or from a computer network server, the location information relating to the actual position of the mobile transceiver;

computing a pseudo-position of the mobile transceiver from the location information, the pseudo-position comprising a second set of coordinates in the coordinate system, the second set of coordinates being different from the first set of coordinates; and forwarding the pseudo-position to at least one user moving independently from the object.

2. The method of claim 1 in which the location information contains information relating to the motion of the mobile transceiver, and computing the pseudo-position comprises analyzing information relating to the motion of the mobile transceiver.

3. The method of claim 1 in which the location information comprises an estimate of the actual position of the mobile transceiver and a time indicating when the estimate of the actual position was made.

4. The method of claim 1 in which the pseudo-position is forwarded for display to the at least one user, the at least one user being involved in a wireless location based game.

5. The method of claim 1 in which the object is a participant in a game.

6. The method of claim 5 in which the participant is provided with the option of forwarding the actual position of the mobile transceiver or the pseudo-position to the at least one user.

7. The method of claim 6 in which the participant toggles between forwarding the actual position of the mobile transceiver and the pseudo-position to the at least one user.

8. The method of claim 1 in which the pseudo-position and the actual position are displayed to the at least one user.

9. The method of claim 1 in which the pseudo-position is sufficiently spatially displaced relative to the actual position of the mobile transceiver to avoid the mobile transceiver being located by the at least one user.

10. The method of claim 9 in which the location information contains information relating to the motion of the mobile transceiver, and computing the pseudo-position comprises analyzing information relating to the motion of the mobile transceiver.

11. The method of claim 9 in which the location information comprises an estimate of the actual position of the mobile transceiver and a time indicating when the estimate of the actual position was made.

12. The method of claim 9 in which the pseudo-position is forwarded for display to the at least one user, the at least one user being involved in a wireless location based game.

13. The method of claim 9 in which the object is a participant in a game.

14. The method of claim 13 in which the participant is provided with the option of forwarding the actual position of the mobile transceiver or the pseudo-position to the at least one user.

15. The method of claim 14 in which the participant toggles between forwarding the actual position of the mobile transceiver and the pseudo-position to the at least one user.

16. The method of claim 9 in which the pseudo-position and the actual position are displayed to the at least one user.

17. The method of claim 1 in which the coordinate system comprises latitude and longitude coordinates.

18. The method of claim 17 in which the pseudo-position is forwarded for display to the at least one user, the at least one user being involved in a wireless location based game.

19. The method of claim 18 in which the object is a participant in a game.

* * * * *

UNITED STATES PATENT AND TRADEMARK OFFICE
CERTIFICATE OF CORRECTION

PATENT NO. : 7,477,905 B2
APPLICATION NO. : 10/792385
DATED : January 13, 2009
INVENTOR(S) : James George It is certified that error appears in the above-identified patent and that said Letters Patent is hereby corrected as shown below:

Column 10, line 63, delete "method processing" and insert --method for processing-- therefor.

Signed and Sealed this

Twenty-seventh Day of April, 2010

David J. Kappos
*Director of the United States Patent and Trademark Office*